(12) United States Patent
Buentello et al.

(10) Patent No.: US 11,580,855 B1
(45) Date of Patent: Feb. 14, 2023

(54) SYSTEMS AND METHODS FOR PROVIDING WARNINGS OF IMMINENT HAZARDS

(71) Applicant: UIPCO, LLC., San Antonio, TX (US)

(72) Inventors: Andre Rene Buentello, San Antonio, TX (US); Nina Schuessler, San Antonio, TX (US); Ashley Raine Philbrick, San Antonio, TX (US); Stacy Callaway Huggar, San Antonio, TX (US); Jose L. Romero, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/466,909

(22) Filed: Sep. 3, 2021

Related U.S. Application Data

(63) Continuation of application No. 16/864,609, filed on May 1, 2020, now Pat. No. 11,145,202.

(51) Int. Cl.
| | |
|---|---|
| H04N 5/228 | (2006.01) |
| H04N 5/225 | (2006.01) |
| H04N 9/74 | (2006.01) |
| H04N 7/18 | (2006.01) |
| G08G 1/0967 | (2006.01) |
| G08G 1/005 | (2006.01) |
| B60R 11/04 | (2006.01) |
| G06V 20/10 | (2022.01) |
| G06V 20/58 | (2022.01) |

(52) U.S. Cl.
CPC ............ G08G 1/0967 (2013.01); B60R 11/04 (2013.01); G06V 20/10 (2022.01); G06V 20/58 (2022.01); G08G 1/005 (2013.01); H04N 7/181 (2013.01)

(58) Field of Classification Search
USPC ........... 348/208.15, 207.99, 82, 61, 118, 120
See application file for complete search history.

(56) References Cited

U.S. PATENT DOCUMENTS

| | | |
|---|---|---|
| 5,053,778 A | 10/1991 | Imhoff |
| 2008/0129541 A1 | 6/2008 | Lu et al. |
| 2015/0127212 A1 | 5/2015 | Chacon et al. |
| 2016/0093212 A1* | 3/2016 | Barfield, Jr. ......... G08G 1/0133 348/144 |
| 2019/0329768 A1 | 10/2019 | Shalev-Shwartz et al. |
| 2020/0027337 A1 | 1/2020 | Cruz Huertas et al. |
| 2021/0020044 A1* | 1/2021 | Adkar ................... G07C 5/008 |

* cited by examiner

*Primary Examiner* — Daquan Zhao
(74) *Attorney, Agent, or Firm* — Plumsea Law Group, LLC

(57) ABSTRACT

A system and method for alerting a driver of a motor vehicle or a person walking along a road or hiking on a trail of potentially dangerous hazards in their path. Hazards may be deep water, ice, oil slicks or other hazards. In the case of a motor vehicle, the system uses cameras mounted on or within the vehicle to detect potential hazards and then analyzes the images combined with the known topography of the location to evaluate the ability of the vehicle to safely traverse the hazard. In the case of a person walking or hiking, the person may use the camera on a personal mobile device to capture images of the hazard and to combine the images with the known topography at the location to evaluate the danger presented by the hazard.

20 Claims, 10 Drawing Sheets

SYSTEMS AND METHODS FOR PROVIDING WARNINGS OF IMMINENT HAZARDS

CROSS REFERENCE TO RELATED APPLICATIONS

This application is a continuation of U.S. application Ser. No. 16/864,609 entitled "Systems and Methods for Providing Warnings of Imminent Hazards", filed May 1, 2020, the disclosure of which is hereby incorporated by reference in its entirety.

TECHNICAL FIELD

This disclosure relates to systems and methods for detecting the presence of hazards such as flood waters, ice or oil slicks on a road or path and providing warnings to drivers or other travelers of the hazard.

BACKGROUND

Vehicles or persons travelling on foot may encounter hazardous conditions such as flood waters, ice, or oil on a roadway or path. According to the Flood Hazard Research Centre at Middlesex University in the UK, unsafe conditions for vehicles can arise from as little as 20 inches of standing water in a roadway. At such a depth, most vehicles will become unstable, losing firm contact with the road. As the velocity of the water increases, the depth at which the water becomes unsafe is reduced. For example, according to FEMA, just 12 inches of fast-moving flood water could cause an average vehicle to lose firm contact with the roadway, rendering steering and braking systems ineffective and just 6 inches of fast-moving water could knock down an adult pedestrian. For an individual traveling on foot, water measuring about 20" deep and moving with a velocity of 2 miles per hour will present an increased risk to most adults. Ice and oil slicks may cause vehicles to lose their grip on roadways, make steering or braking very difficult, and may often result in dangerous accidents.

For these reasons, there is a need for hazard warning systems and methods that alert travelers of potential hazards ahead.

SUMMARY

In one aspect, embodiments include a method for alerting a person of a hazard. The method uses at least one camera to obtain images of the hazard and to transmit the images to a hazard detection module. The method also includes obtaining local topographic information within the hazard detection module related to the location of the person. The method also includes combining the images of the hazard with the topographic location using an analysis module associated with the hazard detection module. The method uses the analysis module to identify the hazard and to determine the characteristics of the hazard. The method also includes evaluating whether the hazard poses a significant threat to the safety of the person.

In another aspect, embodiments include a system for alerting a driver of a motor vehicle of a hazard on a roadway. The system includes at least one camera mounted on a front portion of the motor vehicle. The system also includes a hazard detection module in the motor vehicle in communication via a communications module with the at least one camera, with a local topography database, with a display and with a GPS unit. An analysis module associated with the hazard detection module is configured to receive images from the at least one camera and to combine the images with data retrieved from the local topography database to identify the hazard. The analysis module is configured to evaluate any risks posed by the hazard and provide warnings to the driver should the analysis module determine that the hazard poses a significant risk.

In yet another aspect, embodiments include a system for evaluating risks posed by a hazard on a roadway or a path. The system uses an analysis module in communication with a communications module and a local topography database. The system includes at least one camera in communication with the analysis module via the communications module. The system also includes a GPS unit in communication with the analysis module via the communications module and a display configured to receive warnings from the analysis module via the communications module. The analysis module is configured to evaluate images received from the camera in combination with data received from the local topography database and the GPS unit to determine whether the hazard poses a significant risk. The analysis module is configured to transmit warnings to the display whenever it determines that the hazard poses a significant risk.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings like reference numerals designate corresponding parts throughout the drawings.

DESCRIPTION OF EMBODIMENTS

Figure 1:
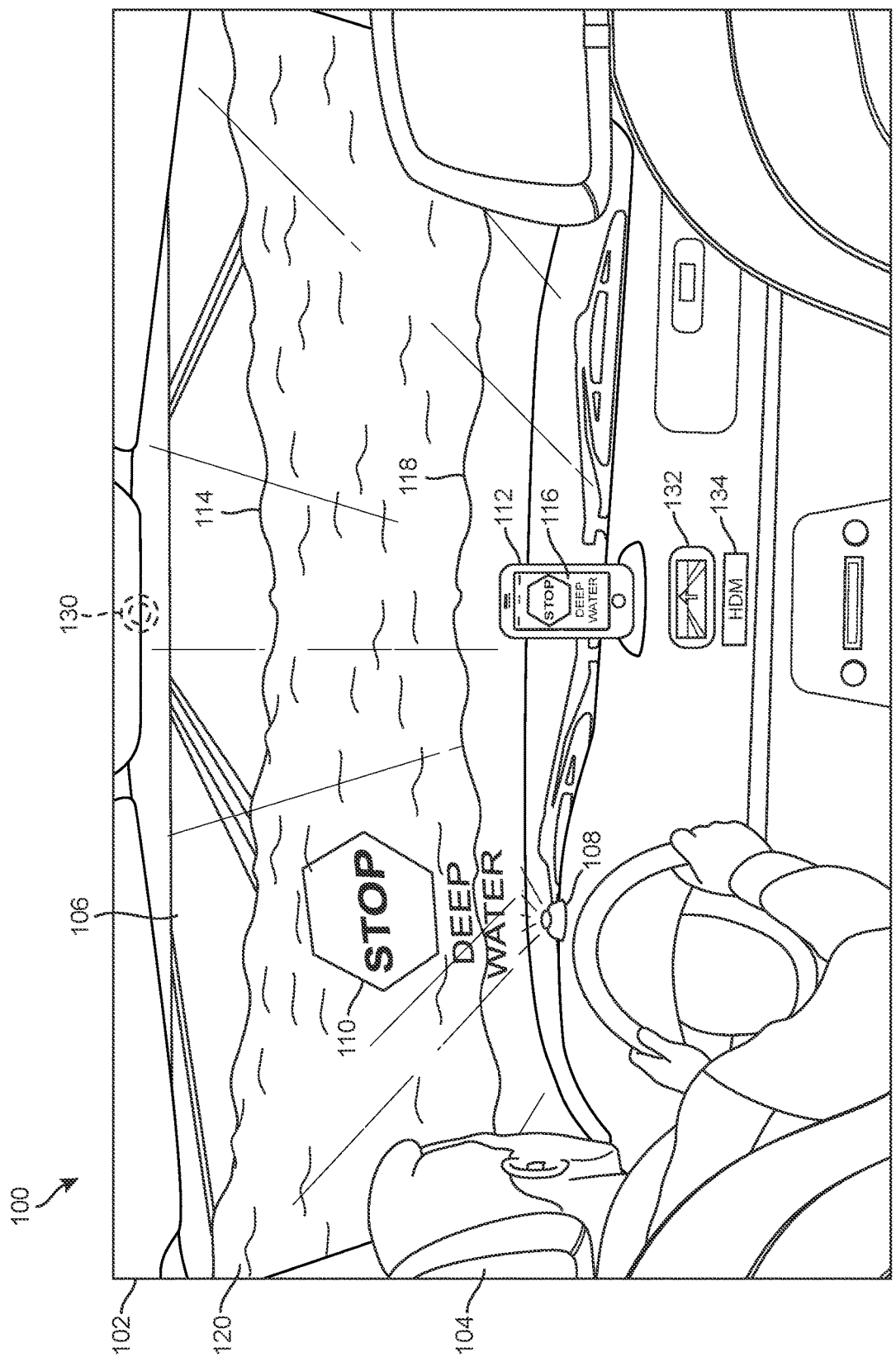
FIG. 1 shows how the road hazard detection system alerts a user in a vehicle of an imminent hazard, in an embodiment.

The embodiments disclosed herein provide systems, methods and devices for detecting and notifying drivers, hikers, or pedestrians of impending hazards. In some embodiments, these systems detect impending hazards obstructing a roadway and notify a driver of a vehicle using this system.

The embodiments disclosed herein assist drivers, hikers, or other pedestrians in determining whether it is safe to drive or walk through hazards, such as flood waters, ice or oil slicks, which may create dangerous conditions while traveling on a road or path. A study by the Flood Hazard Research Centre at Middlesex University in the UK describes risks related to the depth of water and the velocity at which the water may be flowing. The study finds that most adults, depending on height, will be unable to stand in still floodwater measuring a depth of 60″ or greater. As the velocity of the flow increases, the safe depth decreases. For example, some adults will be at risk when the depth is 20″ at a speed of 2 miles per hour. Most adults will be at risk when the depth is 24″ at a speed of 4.5 mph. According to the same study, most cars and vans will become unstable in 20″ of standing water, losing contact with the road. As the speed of floodwater increases, the safe depth decreases. According to FEMA, just 12″ of fast-moving flood water can sweep a vehicle off of a road. Many injuries or even deaths occur during floods because people attempt to walk or drive through water that is too deep or is moving too fast to travel through safely.

The embodiments disclosed herein use data obtained from both external sources (such weather alerts and topographic databases) and internal sources (such as a camera mounted at the front of a vehicle) to determine the depth, speed, and boundaries of water in a road or path and alert the user of the potential danger. Topographical data may be available from the USGS and other agencies; weather data may be available from NOAA and/or from weather alert systems that broadcast over the Internet. The embodiments may use GPS units contained within the user's mobile device (such as a smart phone or tablet) or within the vehicle to determine the user's location. The embodiments may use cameras contained within the user's mobile phone or mounted on the vehicle to capture images of water hazards in order to determine their depth, flow rate, and boundaries. The embodiments may use a heads-up display projected onto the windshield, may use displays on the user's mobile phone or on the vehicle's navigation screen, or may provide audible warnings via the user's mobile device, in order to transmit warnings to the user. The cameras may be mounted on any front portion of the vehicle, such as its grille, front bumper, windshield, or roof.

The embodiments disclosed herein assist the user in detecting ice and black ice, which may create dangerous conditions while traveling on a road or path. Driving on ice can be extremely dangerous. Ice often causes vehicles to lose traction, resulting in skidding and rendering steering and braking systems ineffective. Black ice is particularly dangerous because it's very difficult to detect. For pedestrians, undetected black ice can result in dangerous slips and falls resulting in serious injury. As used herein, the term "pedestrian" shall include a walker, a jogger, a runner, or a hiker, as well as any person engaging in other similar activities. The embodiments described herein detect ice in roadways or paths using cameras, which may be contained within the user's mobile phone or mounted on the vehicle. The embodiments analyze the images for ice and black ice, determine its boundaries, and alert the user of potential danger.

Oil slicks and other hazards such as fallen trees, boulders, broken-down vehicles, fallen power lines, and other objects in a roadway can create serious hazards for drivers. The embodiments disclosed herein assist drivers in detecting oil and physical obstacles in a roadway, which may create dangerous conditions while driving. The embodiments may use cameras contained within the user's mobile phone or vehicle to monitor the road for hazards. The embodiments may analyze the images, identify the boundaries of oil slicks or physical obstacles within the road, and alert the user of potential danger.

FIG. 1 is a schematic illustration 100 showing water 120 flowing across a roadway 106. In this embodiment, a hazard detection system (shown below in the block diagram 400 of FIG. 4) detects the presence of flowing water 120 on roadway 106 and notifies a driver 104 of a motor vehicle 102. In this example, the hazard detection system analyzes images captured by the camera 130 to detect the near boundary 118 of the flowing water 120 and the far boundary 114 of flood water 120 in roadway 106. In the example illustrated schematically in FIG. 1, camera 130 is located just under the roof of the car, pointing forwards toward potential hazard. In other cases, cameras may be located at several positions along the roof of the car, at the front of the grille or in the bumper, for example. The analysis may be performed by hazard detection module (HDM) 134 based on images obtained by one or more camera(s) 130 based on the location provided by GPS unit 132. In some embodiments, this information may be provided to driver 104 via mobile device 112 or via the vehicle's navigation screen. In other embodiments, the information may be provided to the driver via a heads-up display 110 projected by heads-up display unit 108. In yet another embodiment, the information may be provided via an audio warning emitted by the mobile device, for example. In general, the information may be provided using one, two or more of these warning systems. The proximity of motor vehicle 102 to closer boundary 118 may activate the hazard detection system. When activated, the hazard detection system evaluates the hazard and then a warning notification 116 is displayed for the driver on mobile device 112, a warning notification 110 is projected onto the windshield by heads-up display unit 108, or the mobile device 112 notifies the driver via an audio warning. In some embodiments, if driver 104 is close enough to closer boundary 118 and flowing water 120 is sufficiently deep and/or has a sufficiently high flow rate, in addition to warning notification 110 or 116, the warning may include more urgent notifications such as "DANGER— YOUR VEHICLE MAY BE SWEPT AWAY BY THE FLOOD," for example.

Figure 2:
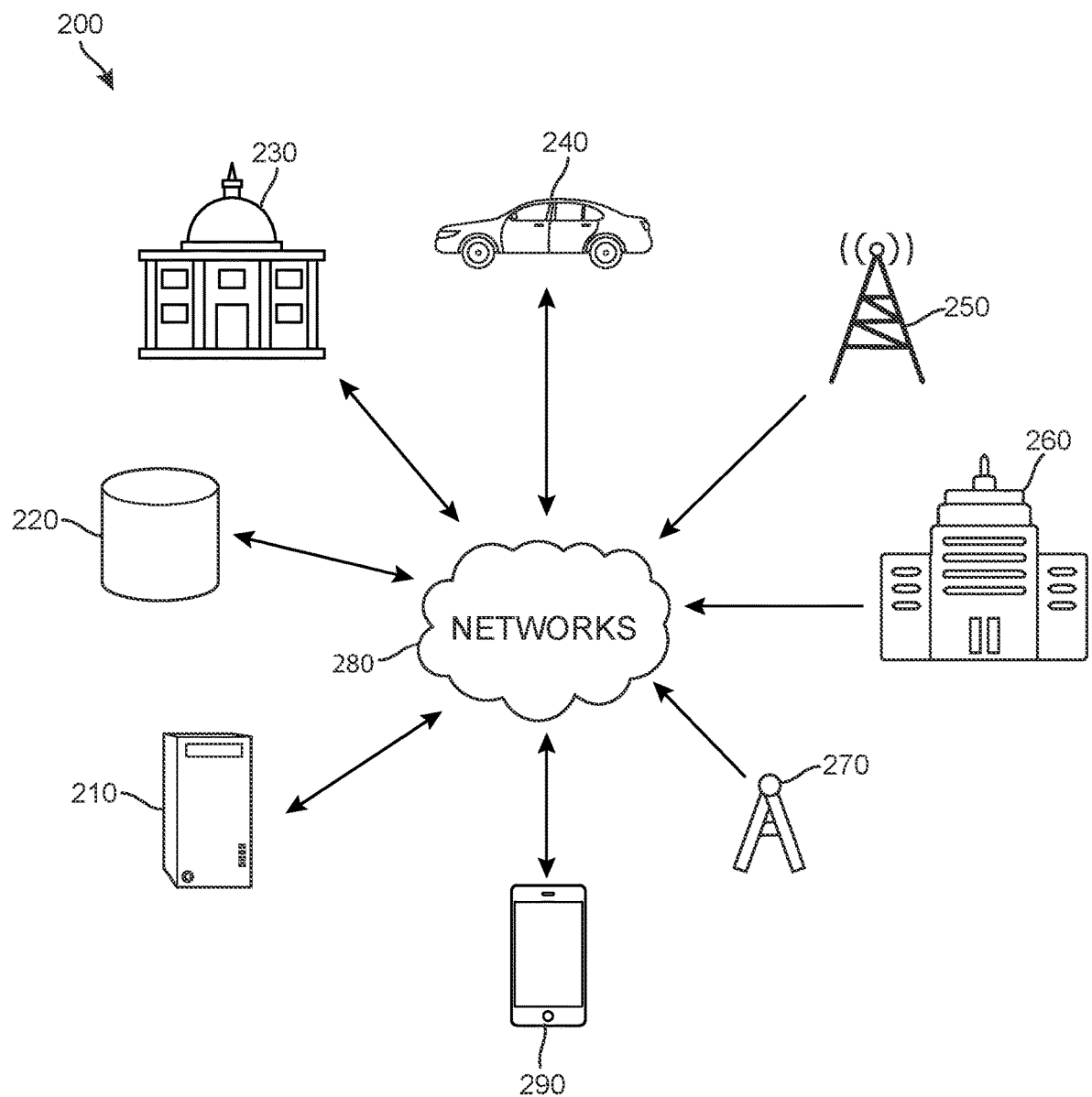
FIG. 2 is a schematic block diagram showing the flow of information between various databases and a vehicle or mobile device, in an embodiment.

FIG. 2 is a schematic diagram 200 showing the transmission of information over a set of networks 280 between various databases and other sources of information and a mobile device 290 on motor vehicle 240. In this embodiment, mobile device 290 receives information from external sources and from the motor vehicle itself that it uses to detect and evaluate road hazards, in an embodiment. In other embodiments, the information may be received in devices installed in vehicle 240 itself, and the analyses may be done using microprocessors or other computing devices installed within the motor vehicle 240. Networks 280 may include local area networks (for example, a Bluetooth or other near-field network) connecting onboard devices and databases present on vehicle 240; cellular/data networks (for example, a 5G network) connecting remote databases to onboard devices and databases present in vehicle 240; general use radio/TV networks that broadcast to onboard devices present in vehicle 240; and dedicated weather/ emergency information networks that broadcast to onboard devices present on vehicle 240.

In some embodiments, the information transmitted over networks 280 is combined with information collected about local roadway conditions with onboard cameras and other devices present on vehicle 240 to predict the presence of impending hazards. Government weather agency 260 (for example, NOAA) provides local weather information about the risk of impending hazards on the road travelled by vehicle 240. In some embodiments, government weather agency 260 provides weather information to a road hazard reporting server 210 which broadcasts local weather information and emergency alerts to vehicle 240 based on its global position system (GPS) coordinates. This information can be sent to road hazard detection reporting server 210 over networks 280. In some embodiments, other contextual information, including local weather information and the presence of local disasters, may be transmitted via general use TV/radio network 250 and/or a dedicated weather/emergency information network 270 which may broadcast over the Internet, for example. In some embodiments, such contextual information is used by the road hazard detection system to determine the frequency with which onboard devices present on vehicle 240 scan for impending road hazards and how much bandwidth such devices may use in such scanning. In some embodiments, information about cloud cover and other sunlight conditions transmitted from government agency 260 is input into the road hazard detection system to help analyze camera images collected to predict or evaluate potential impending road hazards.

Map database 230 provides topographical and roadway positional information to the road hazard detection system. Map database 230 may be a government agency (such as the USGS) or it may be a private database. In some embodiments, map database 230 may provide topographical information and roadway positional information to a road hazard detection server 210, which then sends local topographical information to vehicle 240 based on the vehicle's GPS coordinates. For example, it may broadcast this information to all mobile devices within a limited area over a network of micro-antennas. Such topographical and roadway information may be supplemented by a local topographical and roadway map database 220. Local topographical and roadway map database 220 contains topographical information, roadway position information, and other relevant flooding information for use by the road hazard detection system. For example, in some embodiments, a weather-alert database may contain information about the likely depth of water and flow rate of the water. The road hazard detection system may then combine the images received from one or more cameras mounted towards the front of the vehicle (see FIG. 4) with the information received from the map database and/or the information received from the local topographical information to estimate the likely depth of the water. The road hazard detection system may estimate the possible depth of the water and determine the boundaries of the area to be scanned for flood water, for example.

In some embodiments, if analysis of topographical information, roadway information, emergency information, and/or information received from onboard devices indicates there is a hazard present in the roadway on which vehicle 240 is driving, a warning with relevant hazard details may be displayed on a mobile device 290, the vehicle's navigation system or on a heads-up display as shown in FIG. 1. In some embodiments, such an identified hazard may be reported over networks 280 to road hazard detection server 210 so that other nearby vehicles utilizing such a system can be notified of the identified hazard. In some embodiments, if the hazard that has been identified is flooding in the roadway, such a warning includes the distance vehicle 240 is from the flooding hazard, the boundaries of the flooding hazard, and the likely depth of the flooding hazard. In some embodiments, exceptionally dangerous hazards include further warnings or instructions delivered to the driver or occupants of vehicle 240.

In some embodiments, road hazard detection modules are onboard devices present on vehicle 240. Such road hazard detection modules may be contained in a mobile device 290 or elsewhere in other devices within vehicle 240. In other embodiments, road hazard detection modules may be housed in remote servers and communicate warnings about impending hazards to onboard display devices in vehicle 240, such as mobile device 290 or other devices in vehicle 240, via networks 280.

In some embodiments, vehicle 240 includes onboard map databases that store topographical and other relevant roadway information for assessing flooding for roads that vehicle 240 drives on regularly. For example, in these embodiments, such onboard map databases may include images of such roads taken when those roads are free of any hazards for comparison to images taken at a given moment when such hazards may be present. Such onboard storage allows the road hazard detection system to more efficiently and accurately assess potential roadway hazards on such roads. Moreover, if vehicle 240 is unable to receive transmissions from any of the networks 280, such onboard map databases may still allow the road hazard detection system to assess such roads for potential hazards.

Figure 3:
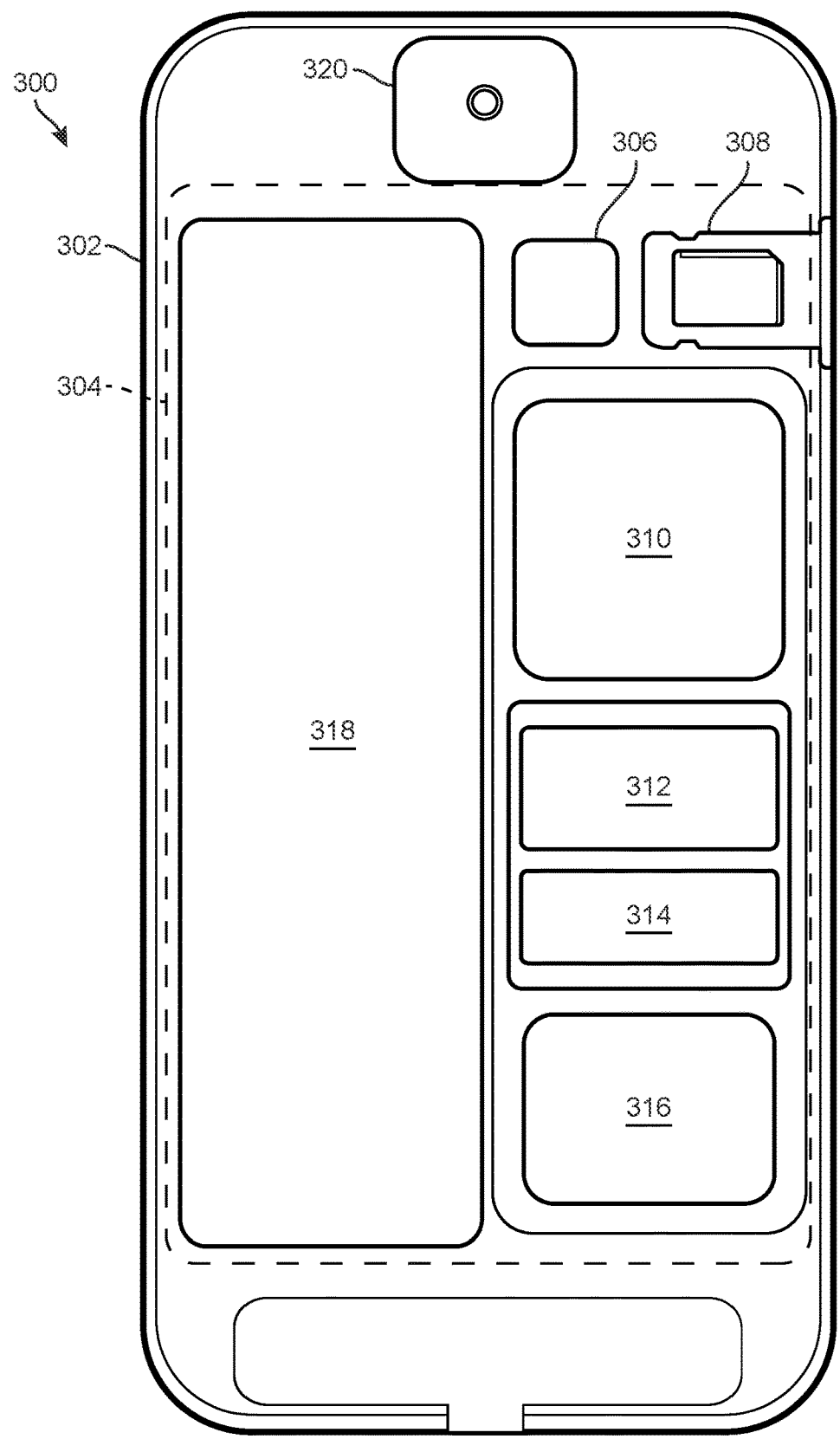
FIG. 3 is a schematic diagram of a smart phone showing the components involved in the road hazard detection system, in an embodiment.

FIG. 3 is a schematic diagram 300 of a mobile device 302 showing components that may be used in the road hazard detection system in an embodiment. Mobile device 302 includes a display 304. Display 304 may display warnings of imminent hazards to a user of mobile device 302 when such hazards are detected. The warnings may also characterize the hazard and include other relevant details about the hazard. Display 304 also acts as a user interface that a user of mobile device 302 may use to set parameters relating to scans for potential roadway hazards, such as the frequency of such scans. In some embodiments, mobile device 302 can report detected hazards to a server dedicated to tracking such hazards on roadways.

Mobile device 302 additionally includes a GPS unit 306. Data obtained from this GPS unit allows mobile device 302 to report its location to onboard and network databases so that the extent and the depth of any detected flooding in the roadway may be determined based on the topography of the roadway. Also, mobile device 302 may report the location of identified hazards to network servers associated with the road hazard detection system. Mobile device 302 may also include a subscriber identity module (SIM) 308. In some embodiments, SIM 308 may serve to associate mobile device 302 with the vehicle using the roadway hazard detection system, either at a particular moment in time or as a more permanent association.

Mobile device 302 may also include a processing unit 310 that acts as a control module for the components of mobile device 302, including display 304 and camera 320. In those embodiments in which mobile device 306 includes the roadway hazard detection module itself, processing unit 310 may also include the roadway hazard detection module. In other embodiments, processing unit 310 merely acts a control module for a separate roadway hazard detection module present on mobile device 302 or in some other device within the vehicle. In other embodiments, the roadway hazard detection module is remote, and mobile device 302 displays warnings and other emergency information received from the roadway hazard detection module. In such embodiments, processing unit 310 in mobile device 302 may receive communications from the remote hazard detection module so that mobile device 302 may be notified whenever an imminent hazard is identified by the remote hazard detection module.

Mobile device 302 may also include a connection module 316. Connection module 316 is associated with wired connections to mobile device 302. For example, the wired connections may be used for charging mobile device 302 or for making a wired connection between mobile device 302 and another device. In some embodiments where the roadway hazard detection system includes additional cameras, a wired connection between mobile device 302 and one or more additional cameras may be preferred for increased efficiency and speed of hazard identification. In some embodiments, connection module 316 serves as a communications path for updating firmware or uploading map data into a road hazard detection module installed on mobile device 302.

Mobile device 302 further includes a memory 314. In some embodiments, memory 314 stores images of the roadway generated by camera 320 before the images are processed by the roadway hazard detection module. In some embodiments, memory 314 may also serve as local storage for topographical and other roadway information, in some cases including images of roads that are regularly traveled by the vehicle associated with mobile device 302, taken when those roads are free of any hazards.

Mobile device 302 may also include a communication module 312. Communication module 312 is associated with wireless communications (such as WiFi, Bluetooth, near field communication (NFC) technologies, and 3G, 4G or 5G for transmissions over the Internet) and other devices, servers, and databases either local to the vehicle associated with mobile device 302 or remote to the vehicle. In some embodiments, communication module 312 thus allows mobile device 302 to wirelessly send and receive warnings regarding the presence and extent of imminent threats; receive topographical and other roadway information from remote or local servers or databases; receive weather or emergency information from remote servers or networks; and receive roadway imagery from other local cameras for analysis of potential roadway hazards.

Mobile device 302 also includes a battery 318 and a camera 320. Battery 318 provides the power source for mobile device 302. In some embodiments, under the direction of a road hazard detection module, camera 320 takes images of the roadway to be analyzed by the road hazard detection module for the presence and extent of imminent hazards.

Figure 4:
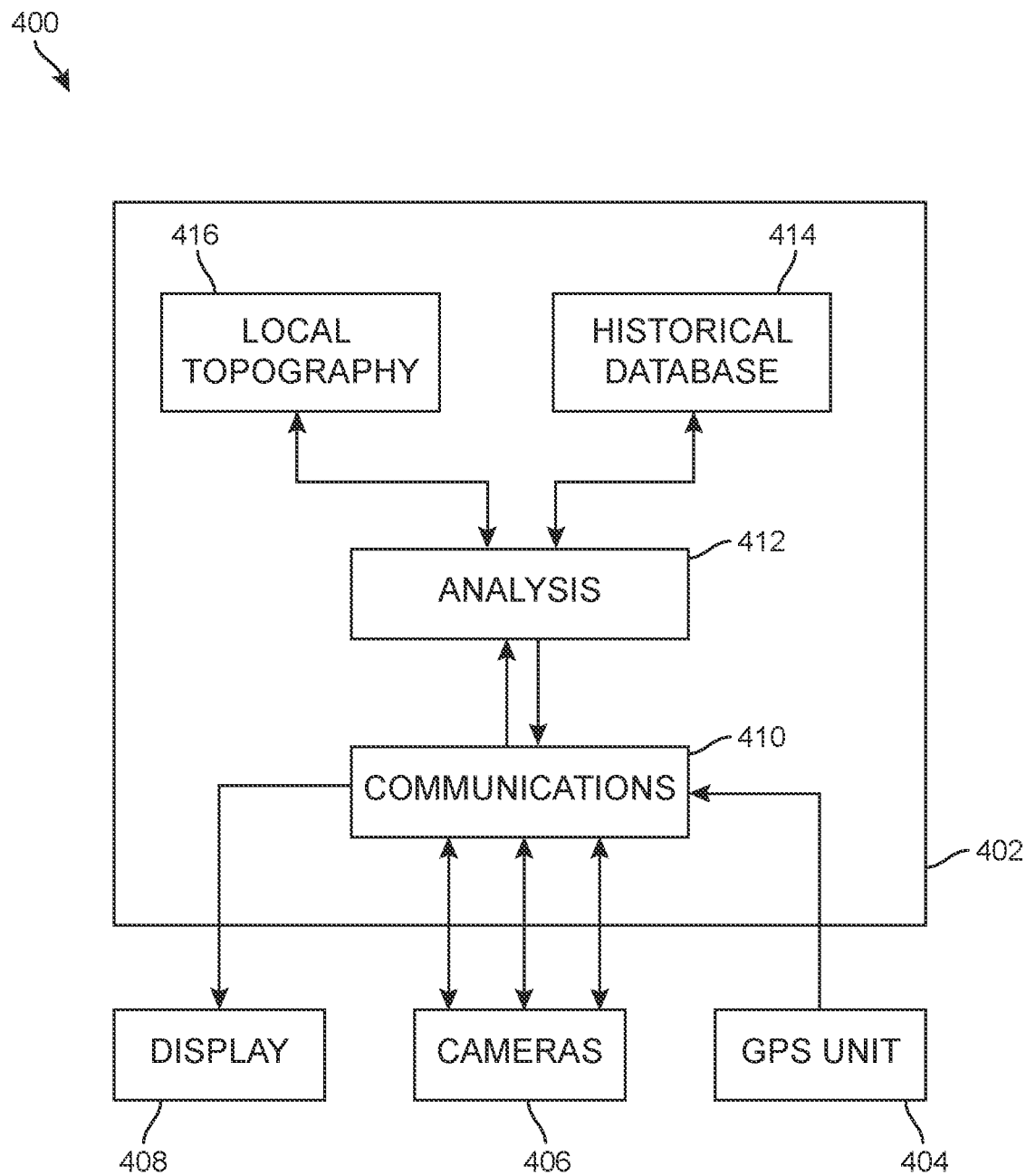
FIG. 4 is a schematic diagram of the systems in the vehicle used to identify an imminent road hazard, in an embodiment.

FIG. 4 is a schematic diagram 400 of the modules that may be installed or carried in a vehicle (such as vehicle 240 illustrated in FIG. 2) that may be used to detect and identify imminent road hazards. In this embodiment the vehicle has a road hazard detection module 402 within the vehicle. In this embodiment, the vehicle has one or more cameras 406 that can take images of the roadway to be analyzed for potential imminent hazards in the roadway. In this embodiment, communications module 410 serves as a link over which roadway images received from cameras 406 may be transmitted to analysis module 412. In some embodiments, cameras 406 are pointed towards the roadway and focused under the direction of the analysis module 412. In some embodiments, analysis module 412 uses the GPS coordinates of the vehicle and roadway imagery to ensure that cameras 406 are pointed along the roadway. In some embodiments, identification of a potential hazard in the roadway by analysis module 412 directs the focus of one or more of cameras 406 towards that potential hazard for more intensive analysis. In some embodiments, cameras 406 may be integral to a mobile device associated with the vehicle. In some embodiments, the mobile device with the integral camera is mounted on a gimbal so it can be pointed along the roadway under the direction of analysis module 412. In some embodiments, cameras 406 are positioned across the front of the vehicle, for example in the front bumper or along the roof, so that the cameras can capture a full view of the roadway regardless of which way the oncoming roadway may turn.

In this embodiment, if analysis of roadway images shows that there is water in the roadway, a call is made by analysis module 412 to the GPS unit 404 for the vehicle's current GPS coordinates over communications module 410. In this embodiment, those GPS coordinates are provided to a local topographic database 416 and to a historical database 414. Local topographic database 416 provides the topography for the section of roadway immediately in front of the vehicle to analysis module 412. In some embodiments, local topographic database 416 receives regular updates from a remote support server so that its topographical information is accurate. In some embodiments, communications module 410 serves as the link to external devices the roadway hazard detection device may use for identifying roadway hazards, such as roadway cameras. An internal bus carries roadway information, such as topographical or positional information, from the internal databases to the analysis module 412.

In this embodiment, historical database 414 contains topographical data collected from onboard vehicle devices on routes that the vehicle takes regularly. Such data may be more detailed and more up-to-date than the information stored in local topography database 416. Analysis module 412 thus stores images produced by cameras 406 in historical database 414 if the vehicle's GPS coordinates indicate that it is on a route that vehicle takes often. In this embodiment, if the vehicle's GPS coordinates indicate that historical database 414 contains information about the current road and analysis module 412 indicates there is some potential hazard on the roadway, then the historical database may return such information to analysis module 412. For example, analysis module 412 may compare current images of the roadway immediately in front of the vehicle with images made of the same roadway under hazard-free conditions. In some embodiments, the roadway hazard detection system can ask the driver if images taken of the roadway on a particular route are suitable for storage as occurring under hazard-free conditions. In some embodiments, such images may be categorized according to, for example, sunlight, nighttime, time of day, rain or other precipitation or other contextual conditions so that current roadway images may be matched with images taken under similar contextual conditions.

In some embodiments, historical database 414 corrects and improves the precision and accuracy of local topographical maps stored in the local topographic database 416. In these embodiments, onboard vehicle devices such as GPS units and accelerometers can detect smaller changes in elevation than would be typically reported in many publicly available topographic maps and may provide more incremental topographic data. The improved topographic information may be stored in the historical database. In these embodiments, when the analysis module produces a call to historical database 414 and local topographic database 416, any such incremental topographic information would supersede any topographic information contained in the local topographic database.

In this embodiment, information collected in this manner from historical database 414, local topographical database 416, and one or more cameras 406 is collected by analysis module 412. In some embodiments, images taken by one or more cameras 406 include images taken of different sections of the roadway by cameras positioned on different locations on the vehicle and images focused on different parts of the roadway. In some cases, analysis module 412 may direct a subset of cameras 406 to focus on a particular feature it has noted in the roadway. In this embodiment, such images are then analyzed for potential roadway hazards. In some embodiments, these potential roadway hazards may include floods, ice, black ice, and oil slicks, as well as other potential hazards.

In the event analysis module 412 has determined that there is a possible flood in the roadway, it can use this topographic information to estimate the likely depth of any water in the roadway and thus determine the presence and extent of any flooding. In some embodiments, analysis module 412 may optionally inform a remote roadway hazard detection system of the GPS coordinates of any such identified hazards.

In this embodiment, if analysis module 412 determines there is an imminent hazard in the roadway, it sends a warning and further details about the imminent hazard to display 408 via communications module 410. In some embodiments, display 408 may be a heads-up display on the vehicle's windshield, may be the display of a mobile device, or may be the vehicle's navigational display. In some embodiments, further warnings, of increased urgency, can be displayed to the driver of the vehicle if the vehicle continues towards a dangerous hazard.

In other embodiments, the road hazard detection module is running on a remote road hazard detection server and is not local to the vehicle. All analysis of potential roadside hazards thus takes place remotely so that local imagery of roads must be transmitted back to the road hazard detection server and warnings and other hazard notifications identified by the road hazard detection server must be sent over a wireless network to the vehicle for display to the driver.

Figure 5A:
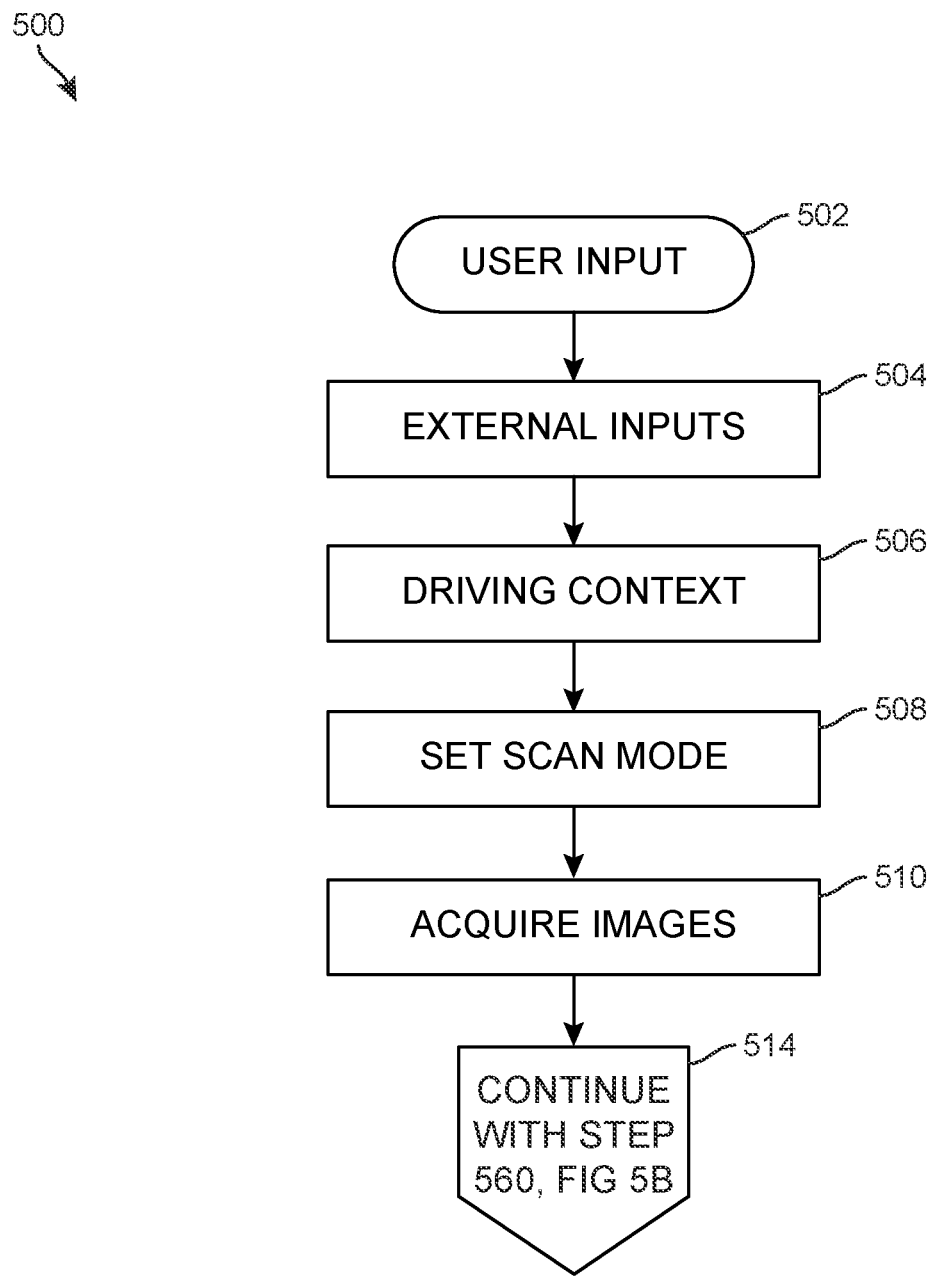
FIG. 5A is a first portion of a flow chart illustrating a first part of a process that may be used to identify potential roadway hazards, in an embodiment.
Figure 5B:
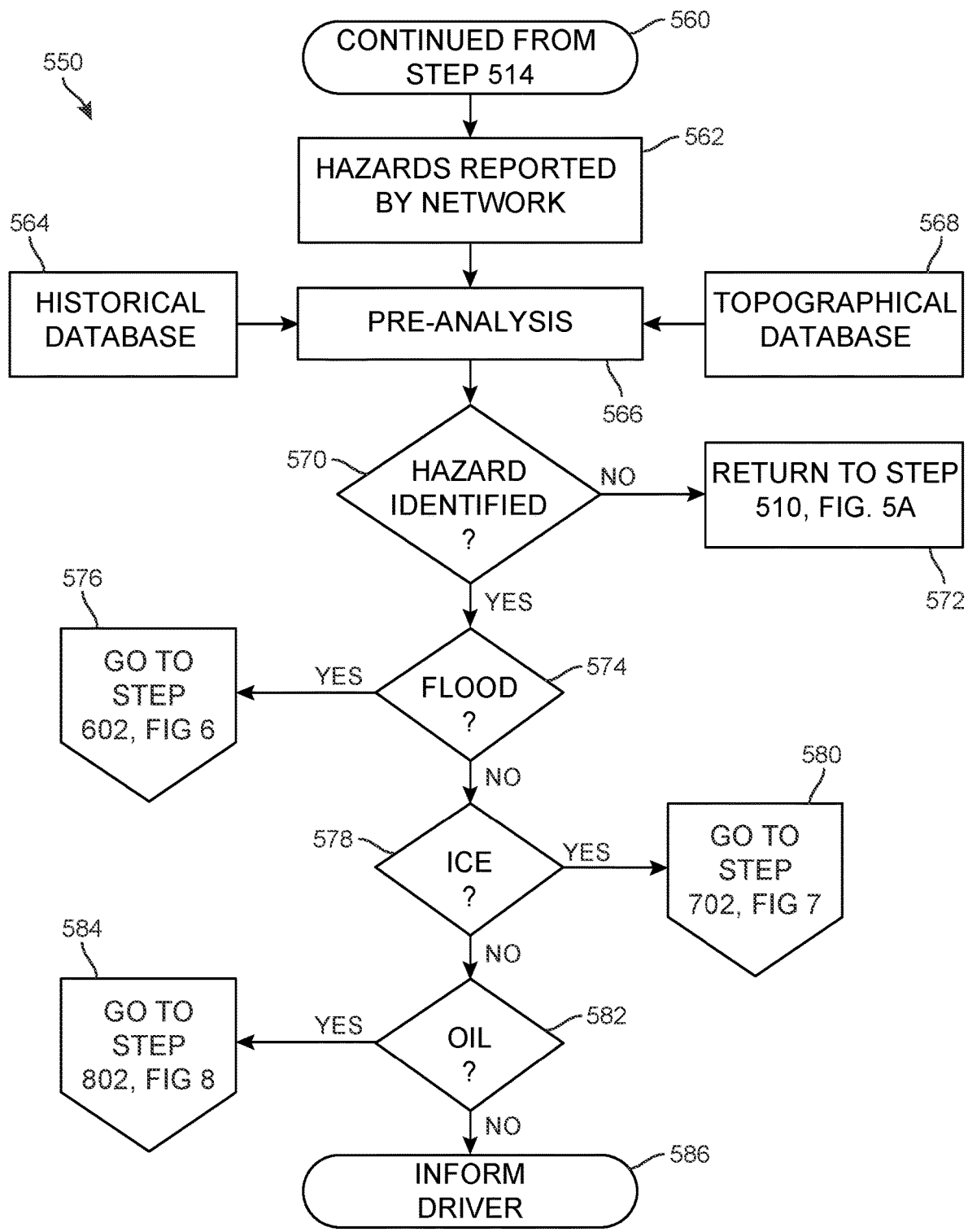
FIG. 5b is a second portion of the flow chart illustrating a second part of the process that may be used to identify potential roadway hazards, in an embodiment FIG. 6 continues the flow chart of FIG. 5B in the event the identified potential hazard is flooding, in an embodiment.

FIG. 5A and FIG. 5B together illustrate an exemplary flow chart of a process for detecting, identifying and evaluating potential hazards. FIG. 5A is a first portion 500 of the flow chart, that illustrates the first set of steps of the decision-making process the road hazard detection system uses to identify imminent hazards from current roadway data. Flow chart 500 begins with user input 502. In this step, the user enters his or her preferences for the intensity of the hazard assessment by the road hazard detection system during the current vehicle trip. In some embodiments, such user preferences may include the frequency of scans for potential road hazards and/or setting bandwidth limits for local area or remote networks used by the road hazard detection system.

At step 504, the road hazard detection system receives external inputs pertaining to the likelihood of potential roadway hazards for the current vehicle trip. For example, these external inputs may include the likelihood there is flooding, ice or black ice in any nearby roadways. In some embodiments, such external inputs include notifications from a roadway hazard detection network server about previously identified hazards nearby, local weather and/or disaster information received from dedicated emergency information networks or cellular/data networks, and/or a roadway hazard detection network server in communication with government weather agencies or other institutions. In some embodiments, the road hazard detection system checks navigation applications in the mobile device (or the vehicle's integral navigation system) associated with the vehicle to see if there is an intended route for the current trip.

At step 506, the road hazard detection system assesses the current driving context. Such an assessment may include input from onboard rain sensors or may note the frequency with which windshield wipers are moving. At step 508, based on the data received during steps 502, 504, and 506, the road hazard detection system decides the frequency that it will scan for potential roadway hazards and how much local and remote network bandwidth to assign to communications pertaining to such scans. For example, it may use an increased frequency of scanning and higher bandwidth limits assigned whenever there is a greater likelihood of potential roadway hazards along some portion of the current trip.

At step 510, one or more cameras capture images of the roadway immediately in front of the vehicle. In some embodiments, this set of cameras is positioned across the width of the vehicle to get a full view of the roadway. In some embodiments, a control module controlling a servo mechanism associated with the road hazard detection system aims this set of cameras to ensure it is pointed towards the oncoming roadway. In some of those embodiments, the control module uses the vehicle's GPS location and knowledge of the local topography to aim the set of cameras. In some of those embodiments, the control module detects the boundaries of the roadway and aims the set of cameras along the length of the roadway. In some of those embodiments, both these techniques are utilized to aim this set of cameras along the roadway.

At step 514, the process is directed to step 560 of flow chart portion 550 illustrated in FIG. 5B, which continues the decision-making process from FIG. 5A. At step 562, the road hazard detection system makes a call to a remote road hazard detection server to determine whether road hazards in the area ahead of the vehicle have been reported to the network associated with such a server. Additionally, in parallel with step 562, calls may be made to a topographical database in step 568 for the topography of the area of the images captured at step 510 of FIG. 5A and to a historical database in step 564, for any previous images taken of this area. At step 566, all the information captured at steps 562, 568, and 564 is provided to the pre-analysis module for preliminary identification of potential imminent road hazards.

In this embodiment, preliminary identification of potential imminent road hazards includes image analysis to decide, at a pre-selected confidence level, if there are any features in the captured images that could represent a road hazard. In this embodiment, the pre-analysis module compares the captured images with what it expects hazard-free road images to look like and categorizes any discrepancies as possible flooding, possible ice or black ice, possible oil slicks, or as an uncategorized hazard or obstruction in the roadway (which could be for example, a tree that has fallen across the roadway, live electrical power lines, or an unknown object lying on the road).

If at step 570 no potential hazard has been identified by the pre-analysis module and no imminent hazard has been reported to the remote road hazard detection server for the area in front of the vehicle, flow chart 550 continues with step 572 which returns the process to step 510 FIG. 5A. If at step 570 a potential hazard has been identified by the pre-analysis module or an imminent hazard has been reported to the remote road hazard detection server for the area in front of the vehicle, then the road hazard detection system classifies the potential hazard or identified hazard according to whether it is flooding; ice or black ice; oil; or as an unknown potential hazard. If at step 574 the potential hazard is a flooded roadway, step 576 directs the process to step 602 of FIG. 6. If at step 578 the potential hazard is determined to be ice, flow chart 550 in step 580 directs the process to step 702 of FIG. 7. If at step 582 the potential hazard is an oil slick, then flow chart 550 at step 584 directs the process to step 802 of FIG. 8. If none of these conditions apply, so that steps 574, 578, and 582 have all produced a negative response, then at step 586, the road hazard detection system notifies the driver of an imminent unknown hazard.

In some alternative embodiments, if the potential hazard is classified as unknown at step 586, this may trigger the cameras to obtain additional focused pictures of the potential hazard to determine the dimensions of the potential hazard. If the confidence level assigned to the determination of the dimensions of the potential hazard or identified hazard exceeds a threshold level, the road hazard detection system may update the remote road hazard detection server with a notice of a hazard at a specific location.

Figure 6:
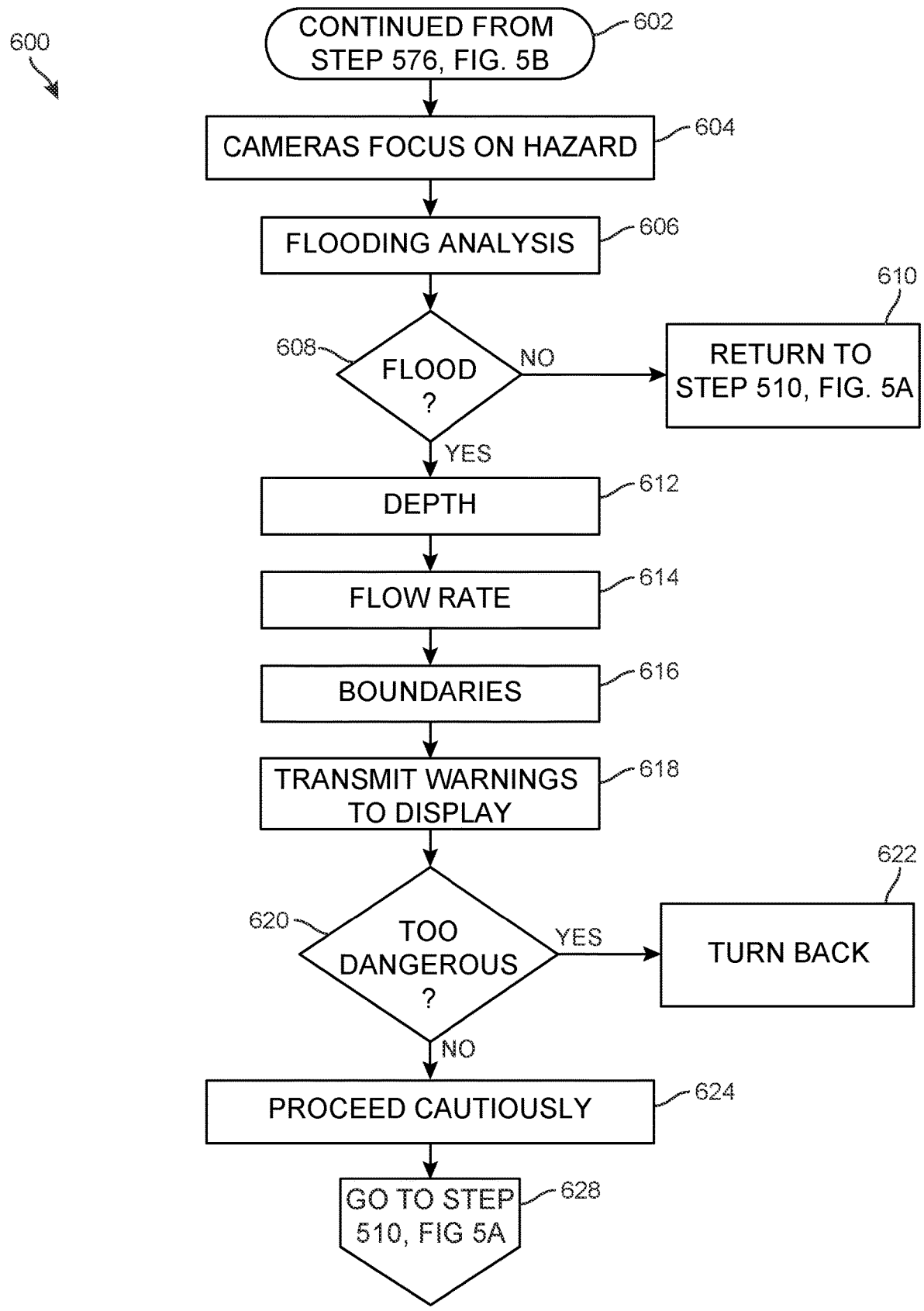

FIG. 6 continues flow chart 550 of FIG. 5B in the event the potential hazard is identified as flooding in the roadway. Flow chart 600 in FIG. 6 continues from step 576 of flow chart 550 of FIG. 5B, starting with step 602 in FIG. 6. At step 604, the cameras on the vehicle (or on the mobile device) focus on the features in previous roadway images that a pre-analysis module of the road hazard detection system has determined could be flooding in the roadway. In some embodiments, the road hazard detection system determines the approximate location of any potential flooding relative to the vehicle and aims and focuses the set of cameras using that approximate location. In some embodiments, such a determination is aided by topographic information and/or past driving history information for the area around this potential flooding. In some embodiments, though some cameras of the road hazard detection system are focusing on some particular feature, other cameras of the road hazard detection system continue to take images of the roadway as a whole to determine if there are any other potential hazards in the road. In some embodiments, the set of cameras is aimed and focused at any flooding that has been identified by the remote road hazard detection server using GPS coordinates of the identified flooding.

At step 606, further image analysis is performed on the set of focused images to determine if there is significant flooding in the roadway. In some embodiments, such analysis consists of implementing image recognition algorithms. In some embodiments, such a determination is aided by topographic information and/or past driving history information for the area around this potential flooding. As a general rule, what corresponds to "significant" flooding may depend upon vehicle type and characteristics. For many vehicles, 6 inches of standing water may be sufficient to preclude driving safely through the flooded portion of the roadway. In some embodiments, the vehicle manufacturer may suggest appropriate parameters for flooding depth, dimensions, and flow rate to trigger a determination of "significant" flooding. If at step 608 the image analysis determines that the flooding does not present a significant danger, flow chart 600 returns in step 610 returns to step 510 of FIG. 5A.

If at step 608 further image analysis by the road hazard detection system determines that there is significant flooding in the road, then at step 612 the road hazard detection system estimates the depth of the flooding. In some embodiments, such an estimate may be made by noting the location and extent of any standing water present in the roadway and estimating depth using local topographic information. In some embodiments, such topographic information is derived from the past driving history of the vehicle. In some embodiments, such topographic information is derived from publicly available topographic maps, such as maps produced by a government agency. Additionally, at step 614 the road hazard detection system estimates the peak flow rate for the flooding in the roadway by, for example, using the movement of objects such as leaves or branches floating by on the surface of the water. Also, at step 616 the road hazard detection system estimates the boundaries of flooding in the roadway. Steps 612, 614 and 616 may be executed in any order or simultaneously.

In some embodiments, peak flow rate estimates are calculated from analyses of successive images of the flooding in the roadway and the time difference between the successive images. In some embodiments, peak flow rate estimates are produced based on surface features of the flooding, such as wave size, the presence and size of ripples or other features associated with water turbulence. In any event, the peak values of estimated flow rates are used for determinations of driving safety.

In some embodiments, if the confidence level behind these determinations exceeds a pre-selected threshold, the road hazard detection system may update a remote road hazard detection server with this information, including the estimated location, depth, flow rate, and dimensions of any flooding in the road.

At step 618, the road hazard detection system transmits a warning to a display in the vehicle, including details about the proximity of the flooding to the vehicle. In some embodiments, this display will be a heads-up display. In some embodiments, this display will be on a mobile device associated with the vehicle. At step 620, the road hazard detection system determines if the flooding is so dangerous that further warnings are required. If at step 624 the road hazard detection system determines that further warnings are not required, it informs the driver to proceed cautiously and flow chart 600 ends at step 628 where the road hazard detection system returns to step 510 of FIG. 5A. If the road hazard detection system determines that the flooding is too dangerous, then at step 622 it instructs the driver to turn back. In some embodiments, if the driver continues towards the flooded area in spite of such warnings, the road hazard detection system may produce further warnings of increased urgency.

In some alternative embodiments, determinations of significant flooding in the roadway by the road hazard detection system that are reported to the remote road hazard detection server may trigger the deployment of drones to the affected area to verify and produce more precise estimates of flood location, depth, flow rate, and dimensions and to take further images of the flooding.

Figure 7:
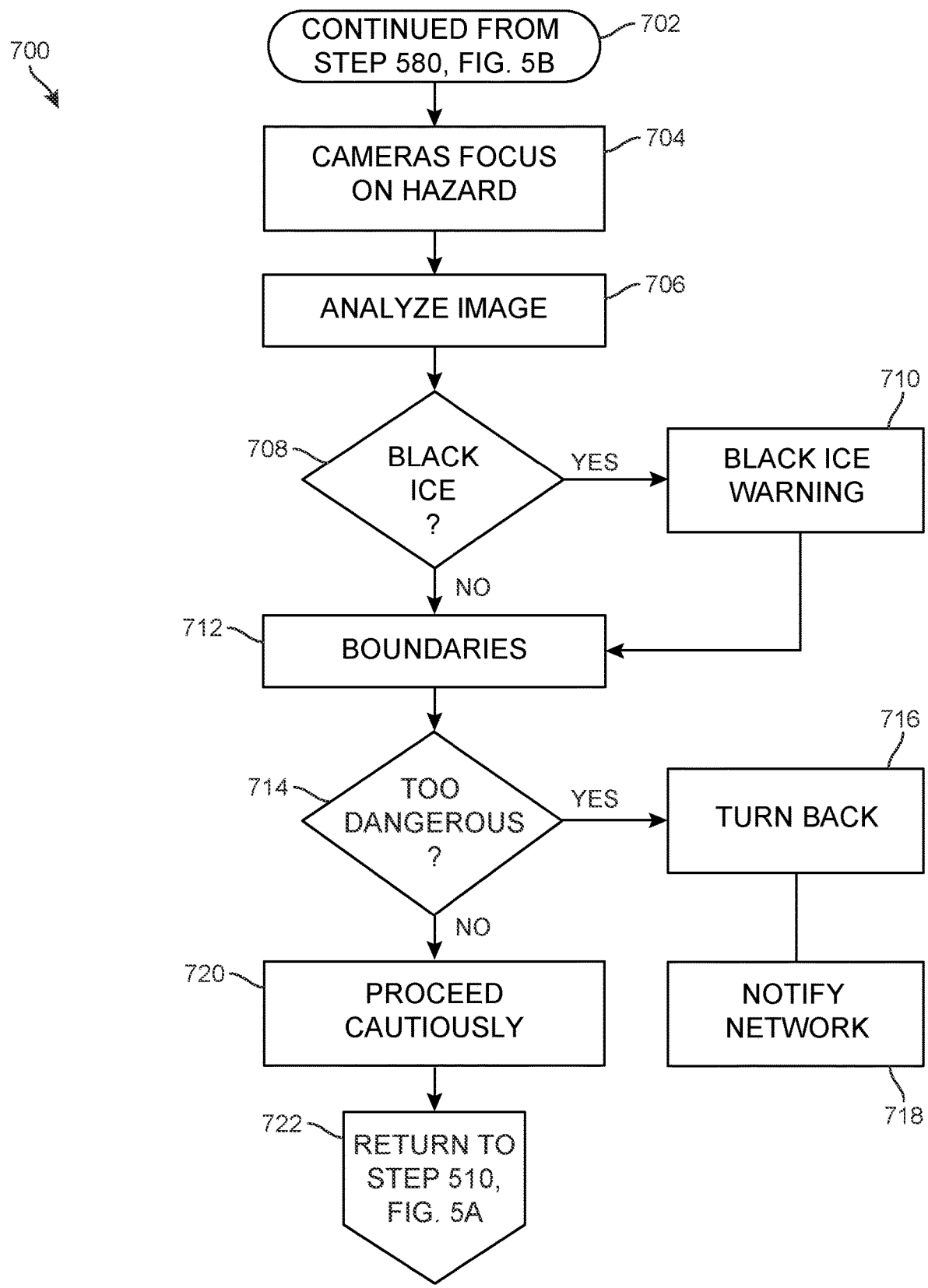
FIG. 7 continues the flow chart of FIG. 5B in the event the identified potential hazard is ice on the roadway, in an embodiment.

FIG. 7 continues the flow chart of FIG. 5B in the event that the potential hazard is ice or black ice in the roadway. Flow chart 700 continues from step 580 of flow chart 550 of FIG. 5B at step 702. At step 704, in some cases, cameras mounted on the front of the vehicle focus on the features in previous roadway images that a pre-analysis module of the road hazard detection system has determined could be ice or black ice in the roadway. In other cases, the cameras focus on a location of ice or black ice that has been identified by a remote road hazard detection server and take further images of these features. In some embodiments, the road hazard detection system determines the approximate location of any potential ice or black ice relative to the vehicle and aims and focuses the cameras using the approximate location.

At step 706, further image analysis is performed on the new set of focused images to determine if there is significant ice or black ice in the roadway to a certain confidence level. In some embodiments, such analysis consists of implementing image recognition algorithms. In some embodiments, once the vehicle is close enough to receive reflected light from the location of the potential hazard or identified hazard, onboard devices (such as the analysis module shown schematically in FIG. 4) determine whether its reflection profile is consistent with ice or with black ice. In some embodiments, devices on the motor vehicle such as headlights may be used to illuminate the ice.

At step 708, further image analysis is performed on the new set of focused images to determine if there is significant black ice in the roadway to a certain confidence level. In some embodiments, such analysis consists of implementing image recognition algorithms that distinguish ice from black ice. For example, ordinary ice reflects mostly white light, whereas black ice may be shiny, but won't reflect much white light. If at step 710, the road hazard detection system determines that there is significant black ice in the roadway, then a black ice warning is transmitted to a display in the vehicle. In some embodiments, such a display is a heads-up display; in other embodiments, the display may be on a mobile device in the vehicle, or on the vehicle's navigation screen.

In either case, the process continues at step 712 to estimate the boundaries and the estimated location of the ice. The boundaries may be determined by a relatively abrupt change in the characteristics of reflected light received by the cameras. In some embodiments, determinations of the boundaries of the ice may consist of implementing image recognition algorithms. In some embodiments, the estimated location of the ice patch is determined by the current GPS location of the vehicle; the characteristics of the image; in what direction the cameras taking the focused pictures are pointing; and the focus characteristics of the cameras taking the focused pictures.

At step 714, based on the anticipated risk posed by the hazard, the road hazard detection system determines what kind of warning to deliver to the driver. If the ice patch is deemed to be too dangerous to drive across, at step 716 the road hazard detection system delivers a message to a vehicle display instructing the driver to turn back. In some embodiments, such a determination is based on the dimensions of the ice patch, whether it extends across the whole width of the roadway and whether the roadway has a steep inclination. In some embodiments, such a display is a heads-up display. Optionally, at step 718, the road hazard detection system informs the remote road hazard detection server of the presence and characteristics of the identified ice patch.

If the ice patch is deemed to be safe enough for the driver to carefully drive across, then at step 720, the road hazard detection system delivers a message to a vehicle display or makes an audible announcement telling the driver to proceed cautiously. Flow chart 700 ends at step 722 by returning the road hazard detection system to step 510 of FIG. 5A.

In some embodiments, according to pre-set driver preferences, when the road hazard detection system identifies ice or black ice in the roadway, the vehicle is automatically decelerated to a safe speed (such as less than 5 mph) once the vehicle has reached a given distance from the estimated location of the ice or black ice.

Figure 8:
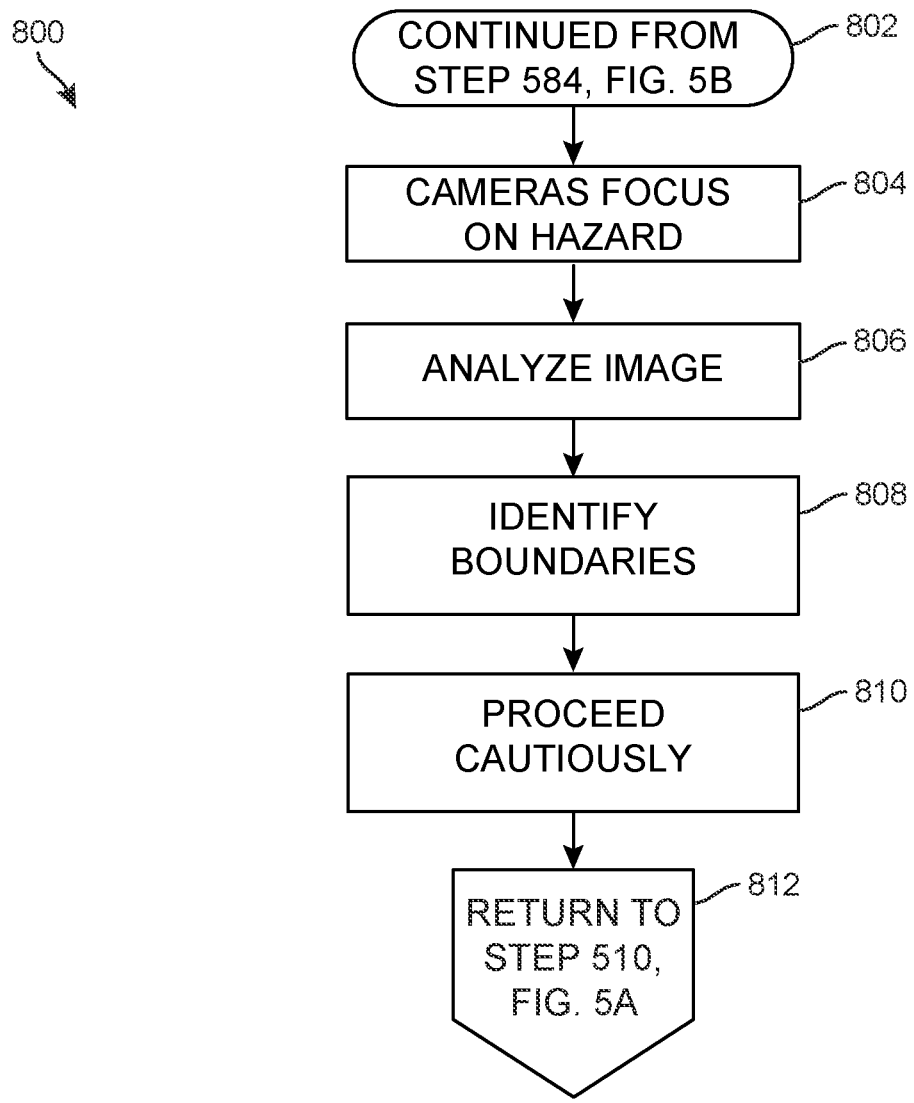
FIG. 8 continues the flow chart of FIG. 5B in the event the identified potential hazard is an oil slick on the roadway, in an embodiment.

FIG. 8 continues the flow chart of FIG. 5 in the event the potential hazard has been identified as an oil slick on the roadway. At step 802, flow chart 800 continues from step 584 of flow chart 550 of FIG. 5B. At step 804, the cameras focus on the features in previous roadway images that a pre-analysis module of the road hazard detection system has determined could be an oil slick in the roadway and may take additional images of the hazard. In some embodiments, the road hazard detection system determines the approximate location of the possible oil slick relative to the vehicle and aims and focuses the set of cameras using that approximate location.

At step 806, further image analysis is performed on the new set of focused images to determine if there is a significant oil slick in the roadway to a pre-selected confidence level. In some embodiments, such analysis consists of implementing image recognition algorithms. In some embodiments, such algorithms detect the characteristic multi-colored pattern that oil slicks may typically display. At step 808, the road hazard detection system identifies boundaries and an estimated location of the oil slick. In some embodiments, determinations of the boundaries of the oil slick may consist of implementing image recognition algorithms. In some embodiments, the estimated location of the oil slick is determined by the location, the characteristics of the image, and the direction in which the cameras are pointing.

At step 810, the road hazard detection system delivers an "oil slick ahead" warning to the driver to proceed cautiously via a mobile device display or a vehicle display. In some embodiments, such a warning includes a continuously updated estimated distance until the vehicle reaches the location of the identified oil slick. At step 812, after the vehicle has succeeded in driving through the oil slick, the road hazard detection system returns to step 510 of FIG. 5A.

In some embodiments, according to pre-set driver preferences, when the road hazard detection system identifies an oil slick in the roadway, the vehicle is automatically decelerated to a safe speed (such as 5 mph) once the vehicle has reached a given distance from the estimated location of the oil slick.

Figure 9:
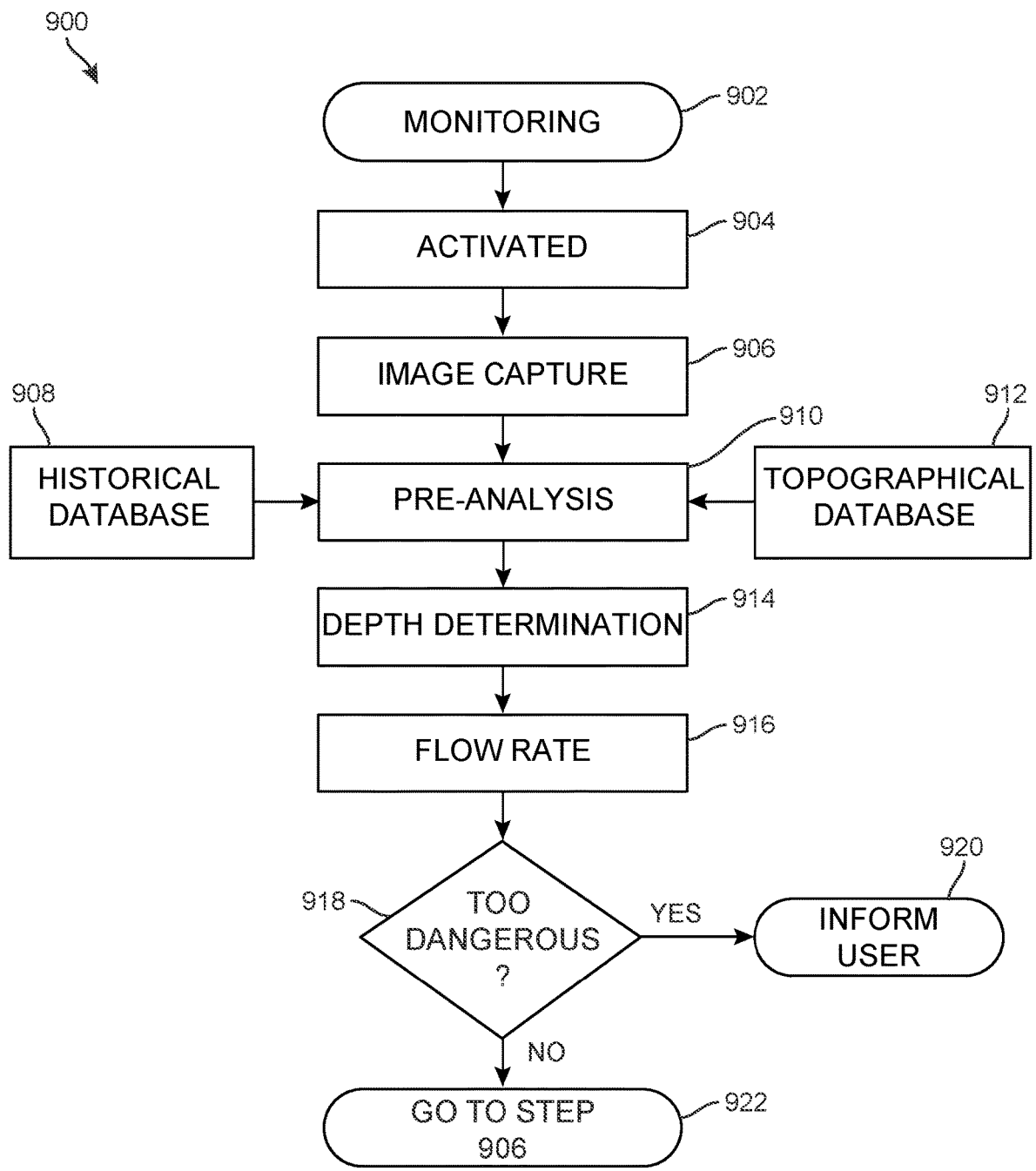
FIG. 9 shows how the road hazard detection system alerts a pedestrian of an imminent hazard, in an embodiment.

FIG. 9 is an exemplary flow chart 900 showing how the road hazard detection system alerts a person, such as a hiker or a pedestrian, of a possibly dangerous water hazard, in another embodiment. In this embodiment, a pedestrian is monitoring the environment using his or her mobile device for potential hazards, such as floodwaters, at step 902. At step 904, the pedestrian activates the system for evaluating a potential hazard. At step 906, a camera in the user's mobile device captures images of the potential hazard. The user may move the mobile device around, aiming at different parts of the hazard in order to capture the boundaries of the water and contextual information about the landscape. Using input from historical databases 908 and topographical databases 912, along with the captured images, an analysis module in the device conducts a pre-analysis, 910. The analysis module in the mobile device may use the mobile device's built-in GPS capability to identify the relevant information in the databases. The analysis module then determines the depth of the water in step 914 and the flow rate of the water in step 916. At step 918, the analysis module determines whether the water is too dangerous because it presents hazardous conditions to the user (in general, this may be based in part upon the user's physical condition). If the conditions are too hazardous, the analysis module alerts the user of the hazard via the mobile device's display or by sounding an audible alarm at step 920. If the potential hazard is not dangerous, in step 922 the process returns to 906 to continue capturing images.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system for alerting a driver of a motor vehicle of a hazard on a roadway comprising:
   at least one camera mounted on the motor vehicle;
   a hazard detection module in the motor vehicle in communication via a communications module with the at least one camera, with a local onboard historical database located physically on the motor vehicle that contains previous images taken of a current location of the motor vehicle, with a display, and with a GPS unit;
   wherein an analysis module associated with the hazard detection module is configured to receive images from the at least one camera and to combine the images with data received from the historical database to detect and identify the hazard, in view of information received from a remote road hazard detection server;
   wherein the analysis module is configured to evaluate any risks posed by the hazard and provide a warning to the driver should the analysis module determine that the hazard poses a risk; and
   wherein the system informs the remote road hazard detection server of the presence and characteristics of the identified hazard.

2. The system of claim 1, wherein
   the system further comprises a local onboard topography database located physically on the motor vehicle; and
   the analysis module is further configured to also combine the images received from the at least one camera with data retrieved from the local topography database.

3. The system of claim 1, wherein
   the remote road hazard detection server is configured to send topographical information to the motor vehicle based on the current location of the motor vehicle; and
   the analysis module is further configured to also combine the images received from the at least one camera with the topographical information received from the remote road hazard detection server.

4. The system of claim 1, wherein
   the road hazard detection system updates the remote road hazard detection server when a confidence level assigned to a determination of the dimensions of a potential hazard exceeds a preselected threshold level.

5. The system of claim 1, wherein
   the system is further configured to aim and focus the at least one camera at the hazard, based on the information received from the remote road hazard detection server.

6. The system of claim 1, wherein
   the presence and characteristics of the identified hazard of which the system informs the remote road hazard detection server include one or more of: the estimated location, depth, flow rate, and dimensions of a flooding hazard on the roadway.

7. The system of claim 1, wherein
   the hazard detection module is further configured to repeatedly scan the roadway in front of the motor vehicle for potential hazards at a predetermined frequency using the at least one camera;
   wherein the predetermined frequency is based on information selected from the group consisting of user preference inputs, local weather information, information describing the presence of local disasters, and current driving context information.

8. A method for alerting a person of a hazard on a roadway comprising:
   repeatedly scanning the roadway for a potential hazard at a predetermined frequency using at least one camera mounted on a motor vehicle;
   using the at least one camera to obtain images of the potential hazard and transmitting the images to a hazard detection module;
   obtaining local topographic information, related to the location of the person from a topography database, within the hazard detection module;
   receiving information from a remote road hazard detection server, within the hazard detection module;
   combining the images of the potential hazard with the local topographic location information using an analysis module associated with the hazard detection module;
   using the analysis module to detect and identify an impending hazard based on the combination of the images of the potential hazard and the local topographic location information, in view of the information received from the remote road hazard detection server;
   using the analysis module to determine the characteristics of the impending hazard based on the combination of the images of the potential hazard and the local topographic location information;
   evaluating whether the impending hazard poses a-threat to the safety of the person;
   displaying a warning on a display whenever the impending hazard poses a-threat to the safety of the person; and
   informing the remote road hazard detection server of the presence and characteristics of the identified hazard.

9. The method of claim 8, wherein
   the predetermined frequency of scanning is based on information selected from the group consisting of user preference inputs, local weather information, information describing the presence of local disasters, and current driving context information.

10. The method of claim 8, wherein
    the local topographic information further comprises information obtained from a historical database of previous images taken of the location of the motor vehicle.

11. The method of claim 8, wherein
    the method further includes a step of aiming and focusing the at least one camera at the potential hazard, based on the information received from the remote road hazard detection server.

12. The method of claim 8, wherein
    the step of informing the remote road hazard detection server of the presence and characteristics of the identified hazard includes updating the remote road hazard detection server when a confidence level assigned to a determination of the dimensions of a potential hazard exceeds a preselected threshold level.

13. The method of claim 8, wherein
the presence and characteristics of the identified hazard of which the system informs the remote road hazard detection server include one or more of: the estimated location, depth, flow rate, and dimensions of a flooding hazard on the roadway.

14. A system for evaluating risks posed by a hazard on a roadway or a path comprising:
an analysis module in communication with a communications module, a local topography database, and a remote road hazard detection server;
at least one camera in communication with the analysis module via the communications module;
a display configured to receive warnings from the analysis module via the communications module, display the warnings to a user, and receive user inputs;
wherein the analysis module is configured to repeatedly scan a roadway for a hazard at a predetermined frequency using the at least one camera, and is configured to receive a user input relating to the predetermined frequency of scanning via the display;
wherein the analysis module is configured to evaluate images received from the camera in combination with data received from the local topography database to detect the hazard and determine whether the hazard poses a risk, in view of information received from the remote road hazard detection server;
wherein the analysis module is configured to transmit warnings to the display whenever it determines that the hazard poses a risk; and
wherein the system informs the remote road hazard detection server of the presence and characteristics of the identified hazard.

15. The system of claim 14, wherein
the system is associated with a motor vehicle, the at least one camera is mounted on the front of the motor vehicle; and
the system further comprises a control module that is configured to aim the at least one camera based on information received from the local topography database.

16. The system of claim 14, wherein
the analysis module is installed in a mobile device which comprises the at least one camera and the analysis module.

17. The system of claim 14, wherein
the presence and characteristics of the identified hazard of which the system informs the remote road hazard detection server include one or more of: the estimated location, depth, flow rate, and dimensions of a flooding hazard on the roadway.

18. The system of claim 14, wherein
the analysis module is further in communication with a historical database that contains previous images taken of a current location of the motor vehicle, the previous images having been taken by the at least one camera and stored in the historical database by the analysis module.

19. The system of claim 14, wherein
the system further comprises one or more drones; and
a determination of flooding in the roadway by the system, that is reported to the remote road hazard detection server, triggers a deployment of the one or more drones to the affected area to verify and produce estimates of flood location, depth, flow rate, and dimensions, and to take further images of the flooding.

20. The system of claim 14, wherein
the system updates the remote road hazard detection server when a confidence level assigned to a determination of the dimensions of a potential hazard exceeds a preselected threshold level.

\* \* \* \* \*